United States Patent
Sakamoto

(10) Patent No.: US 9,625,674 B2
(45) Date of Patent: Apr. 18, 2017

(54) AUTOFOCUS DEVICE AND SAMPLE OBSERVATION DEVICE

(71) Applicant: OLYMPUS CORPORATION, Shibuya-ku, Tokyo (JP)

(72) Inventor: Yohei Sakamoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 99 days.

(21) Appl. No.: 14/804,886

(22) Filed: Jul. 21, 2015

(65) Prior Publication Data

US 2016/0041366 A1 Feb. 11, 2016

(30) Foreign Application Priority Data

Aug. 5, 2014 (JP) .................................. 2014-159618

(51) Int. Cl.
| | |
|---|---|
| *G02B 7/28* | (2006.01) |
| *G02B 21/36* | (2006.01) |
| *G02B 21/02* | (2006.01) |

(52) U.S. Cl.
CPC ............... *G02B 7/28* (2013.01); *G02B 21/02* (2013.01); *G02B 21/361* (2013.01)

(58) Field of Classification Search
CPC ......... G02B 7/28; G02B 21/361; G02B 21/02
USPC .................................................... 250/201.3
See application file for complete search history.

(56) References Cited

U.S. PATENT DOCUMENTS

| | | | |
|---|---|---|---|
| 2002/0080366 A1* | 6/2002 | Nakayama | ......... G01B 11/2441 356/512 |
| 2006/0231730 A1 | 10/2006 | Miyamoto | |
| 2007/0217300 A1* | 9/2007 | Koyama | ............. G11B 7/08511 369/44.23 |
| 2012/0013916 A1* | 1/2012 | Osaki | ................. G01M 11/0271 356/496 |

FOREIGN PATENT DOCUMENTS

| | | |
|---|---|---|
| JP | 09113794 A | 5/1997 |
| JP | 11249027 A | 9/1999 |
| JP | 2006184777 A | 7/2006 |
| JP | 2006293222 A | 10/2006 |

* cited by examiner

*Primary Examiner* — Seung C Sohn

(74) *Attorney, Agent, or Firm* — Holtz, Holtz & Volek PC

(57) ABSTRACT

The autofocus device for a sample observation device provided with an objective is provided with a photodetector, an autofocus optical system that includes a tube lens, that guides light to one of two regions of a pupil plane of the objective that has been divided into two, and that guides light that has passed through the other region after being reflected by a sample to the photodetector, and a light shielding member which is arranged between the tube lens and a light receiving plane of the photodetector and on which an aperture has been formed. The autofocus device satisfies $2.1 < \Phi AP/(2 \cdot \Phi LD)$, where $\Phi AP$ represents a diameter of the aperture and $\Phi LD$ represents a light flux diameter, on the light shielding member, of light reflected by the sample in a state in which the light is condensed on the light receiving plane.

9 Claims, 7 Drawing Sheets

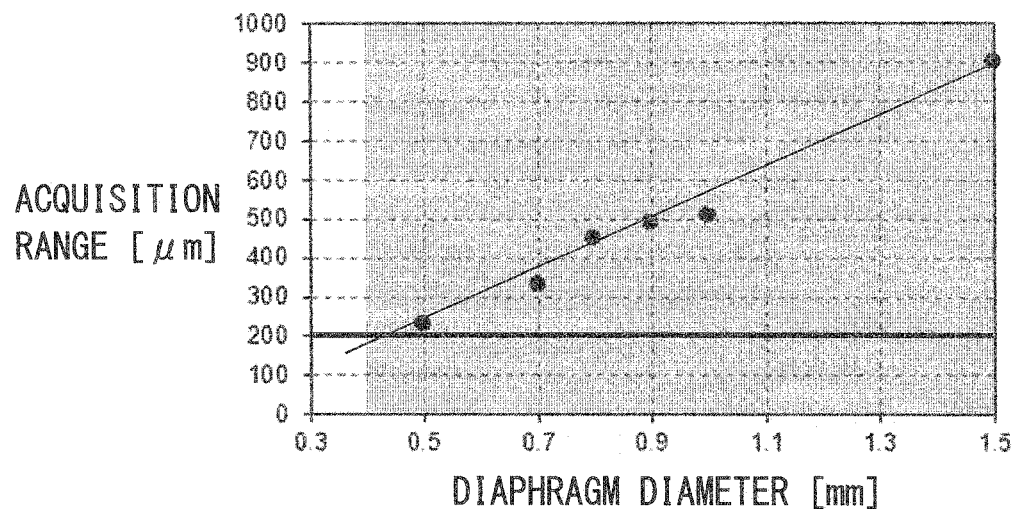
F I G. 4

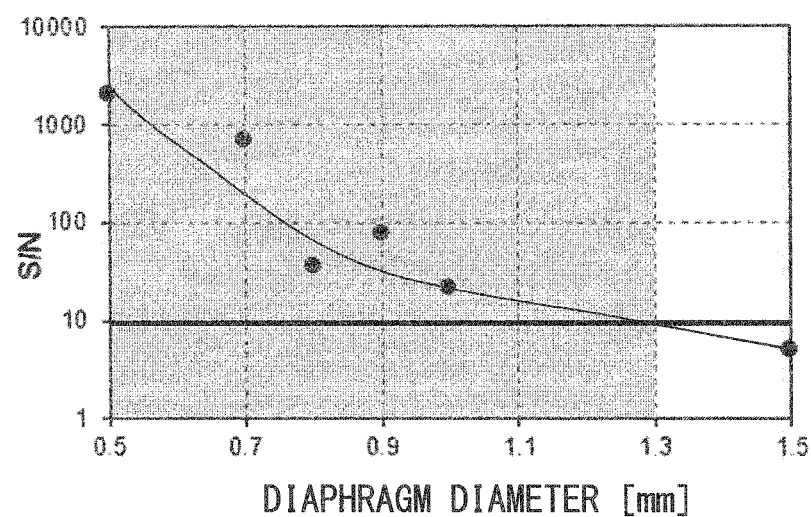
F I G. 5

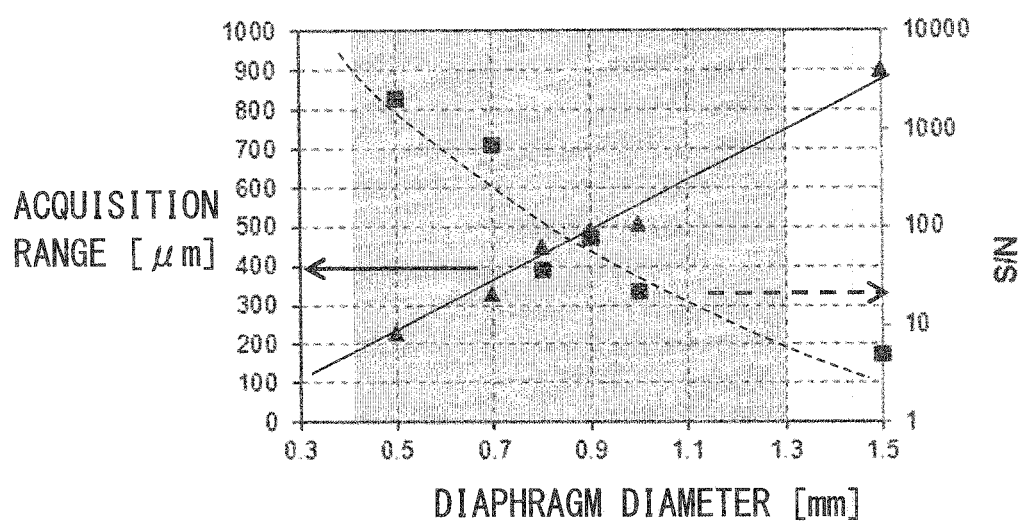
F I G. 6

AUTOFOCUS DEVICE AND SAMPLE OBSERVATION DEVICE

CROSS REFERENCE TO RELATED APPLICATIONS

This application is based upon and claims the benefit of priority from prior Japanese Patent Application No. 2014-159618, filed Aug. 5, 2014, the entire contents of which are incorporated herein by this reference.

BACKGROUND OF THE INVENTION

Field of the Invention

The present invention is related to an autofocus device and a sample observation device provided with an autofocus device.

Description of the Related Art

As an autofocus technique utilized in the field of microscopy, an autofocus technique of an active type as described in for example Japanese Laid-open Patent Publication No. 2006-293222 is known. According to this type, a photodetector having a plurality of light receiving elements detects light to be used for autofocusing (referred to as AF light hereinafter) that has been cast on a sample through one of the two regions obtained by dividing the pupil plane of an objective into two, and the focusing state is detected on the basis of the detected signal.

The autofocus technique based on the above type is employed by microscopes regardless of whether they are industrial microscopes or biological microscopes. However, because planes that are targets of autofocus in biological microscopes have a reflectance that is lower than planes that are targets of autofocus in industrial microscopes, biological microscopes detect less AF light than do industrial microscopes, and have a lower S/N ratio. This often leads to a situation where the detection of the focusing state is not conducted properly due to an influence of AF light reflected by the lens surface of the objective or of a lens of the optical system of the autofocus device (referred to as flare light hereinafter), imposing a limitation on the use of objectives that cause flare light.

In view of this problem, there is a countermeasure in which for example AR (Anti-Reflection) coating for suppressing the reflection of AF light, which is infrared (IR) light, is applied to the lens surface of an objective so as to suppress the generation of flare light.

SUMMARY OF THE INVENTION

A first aspect of the present invention provides an autofocus device for a sample observation device provided with an objective, the autofocus device including a photodetector that detects light, an autofocus optical system that includes a tube lens, that guides light to one of two regions on a pupil plane of the objective that has been divided into two along an optical axis of the objective, and that guides light that has passed through the other of the two regions after being reflected by a sample to the photodetector via the tube lens, and a light shielding member which is arranged between the tube lens and a light receiving plane of the photodetector and on which an aperture has been formed, wherein $2.1 < \Phi AP/(2 \cdot \Phi LD)$ is satisfied where $\Phi AP$ represents an aperture diameter of the light shielding member and $\Phi LD$ represents a light flux diameter, on the light shielding member, of light reflected by the sample in a state in which the light is condensed on the light receiving plane by the autofocus optical system.

Another aspect of the present invention provides a sample observation device including an objective and the autofocus device according to the above aspect.

BRIEF DESCRIPTION OF THE DRAWINGS

The present invention will be more apparent from the following detailed description when the accompanying drawings are referenced.

FIG. 4 shows relationships between the diaphragm diameters and the acquisition ranges in the microscope device shown in FIG. 1;

FIG. 5 shows relationships between the diaphragm diameters and the S/N ratios in the microscope device shown in FIG. 1;

FIG. 6 shows relationships between the diaphragm diameters, the acquisition ranges, and the S/N ratios in the microscope device shown in FIG. 1.

DESCRIPTION OF THE EMBODIMENTS

As a general rule, AR coating for lowering the reflectance to light having a particular wavelength has a relatively higher reflectance to light having other wavelengths. This leads to a situation where when AR coating is applied to an objective in order to lower the reflectance to AF light (IR light), the reflectance to visible light of that objective increases, which is undesirable. In this view, autofocus devices are in demand that can properly detect the focusing state even when an objective that causes flare light is used.

Also, in recent years, many autofocus devices (referred to as AF devices hereinafter) have the function known as continuous AF. Continuous AF is a function of recovering immediately and maintaining the focusing state even when the focusing state was broken temporarily, and is advantageous in for example time-lapse observation, in which a sample is observed continuously. It is desirable that continuous AF be designed to have a range that is, to a certain extent, long, over which the focusing state can be maintained (in other words, a range over which differences are tolerated between a plane that is the autofocus target and a plane on which the AF light is condensed, and this range will be referred to as an acquisition range).

The respective examples will be explained specifically hereinafter in view of the above.

<Example 1>

Figure 1:
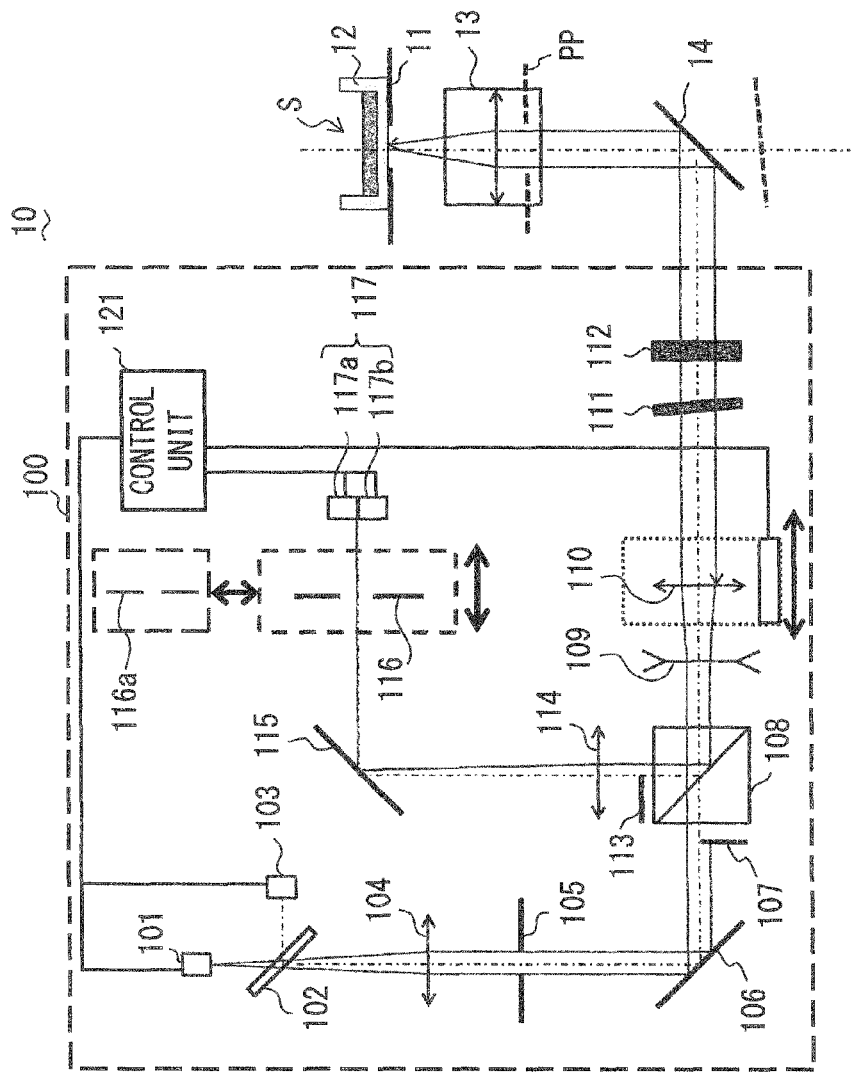
FIG. 1 exemplifies a configuration of a microscope device according to example 1 of the present invention.

FIG. 1 exemplifies a configuration of a microscope device 10 according to the present example. The microscope device 10 is a sample observation device used for observing sample S held by a sample holding member 12 that is disposed on a stage 11. The microscope device 10 includes an objective 13 and an AF device 100 of an active type. Sample S is for example a biological sample immersed in a culture fluid. The sample holding member 12 is for example a petri dish or a multiwell plate.

The AF device 100 includes a laser diode (referred to as an LD hereinafter) 101, an autofocus optical system, a diaphragm 116, a two-segment photodiode (referred to as a two-segment PD hereinafter) 117, and a control unit 121. Note that the group of optical elements having effect on laser light until the laser light is detected by the two-segment PD 117 after emitted from the LD 101 and passing through the diaphragm 116 is referred to as the autofocus optical system. The autofocus optical system includes a PBS (Polarization Beam Splitter) 108, an offset lens 110, a tube lens 114, etc. The control unit 121 conducts various types of control such as the control of the emission of the LD 101, the detection of signals from the two-segment PD 117, the control of movement of the offset lens 110, etc. Also, the control unit 121 outputs information to a monitor (not shown).

Part of the laser light emitted from the LD 101 (AF light) is reflected by a mirror 102 and is detected by a monitor photodiode (referred to as a monitor PD hereinafter) 103. A signal from the monitor PD is output to the control unit 121. The AF device 100 monitors output from the LD 101 on the basis of a signal output from the monitor PD 103. The laser light that has passed through the mirror 102 is converted into parallel light flux by a collimator lens 104 and is incident on a light shielding plate 107 arranged in front of a polarization beam splitter (referred to as a PBS hereinafter) after passing through an aperture diaphragm 105 and reflected by a mirror 106. The light shielding plate 107 is arranged so that it shields half of the light flux of laser light. Accordingly, the other half of the light flux of the laser light, which was not shielded by the light shielding plate 107, is incident on the PBS 108 and is transmitted. The laser light that has been transmitted through the PBS 108 is thereafter incident on the offset lens 110 after passing through the lens 109, the offset lens 110 having been arranged in such a manner that it can move freely in the directions of the light axis. The offset lens 110 is a device for adjusting the condensing position of laser light emitted from the AF device 100. Laser light that passed through the offset lens 110 is thereafter incident on a bandpass filter (referred to as a BPF hereinafter) 112 after passing through a ¼ λ, plate 111. Thereafter, IR light having a wavelength in a prescribed infrared range of the laser light is transmitted through the BPF 112 and is emitted from the AF device 100.

The IR light emitted from the AF device 100 is reflected by a dichroic mirror 14 and is guided to sample S after passing through the objective 13. In more detail, the IR light is guided to one of the two regions of pupil plane PP of the objective 13 that has been divided into two along the optical axis of the objective 13, and is further guided to sample S via the region. The IR light cast on sample S is reflected by the sample S and is again incident on the objective 13. At that moment, the IR light passes through the other of the above-described two regions of the pupil plane PP of the objective 13. In other words, the IR light passes through different regions on pupil plane PP between when it is traveling toward sample S and when it is traveling back from sample S. Thereafter, the IR light is reflected by the dichroic mirror 14 and is incident on the AF device 100.

The IR light that was incident on the AF device 100 is incident on the PBS 108 after passing through a plurality of optical elements (the BPF 112, the ¼ λ plate 111, the offset lens 110, and the lens 109). The IR light includes a polarization plane orthogonal to the polarization plane of the laser light that was incident on the PBS 108 from the LD 101 side. Accordingly, the IR light is reflected by the PBS 108 and is incident on the tube lens 114 via a light shielding plate 113. Note that the light shielding plate 113 is arranged at a position on which laser light (IR light) is not normally incident as a result of half of the light flux of laser light having been shielded by the light shielding plate 107. In other words, light incident on the light shielding plate 113 is stray light such as flare light. The light shielding plate 113 is a device for shielding stray light. The IR light that was incident on the tube lens 114 is converted into convergent light flux, and is incident on the two-segment PD 117 via a mirror 115 and the diaphragm 116.

The two-segment PD 117 is a photodetector that includes a PD 117a and a PD 117b, which are light receiving elements arranged at positions symmetric with respect to the optical axis of the autofocus optical system, and has been arranged in such a manner that the light receiving plane of the two-segment PD 117 is positioned on the focal plane of the tube lens 114. The control unit 121 of the AF device 100 detects the focusing state on the basis of a signal, output from the two-segment PD 117, corresponding to the amount of light that was received by each of the PD 117a and the PD 117b. More specifically, in the AF device 100, when the plane that is the target of the autofocus (reflecting plane) coincides with the plane on which AF light emitted from the objective 13 is condensed, the AF light is condensed at a position that is on the light receiving plane of the two-segment PD 117 and that is on the optical axis of the tube lens 114 so as to form a spot. Accordingly, when the total of the amounts of light received by the PD 117a and the PD 117b is equal to or greater than a prescribed amount and the PD 117a and the PD 117b have respectively received the same amounts of light, the control unit 121 of the AF device 100 determines that the microscope device 10 is in the focusing state, and the control unit 121 detects the focusing state.

Figure 2:
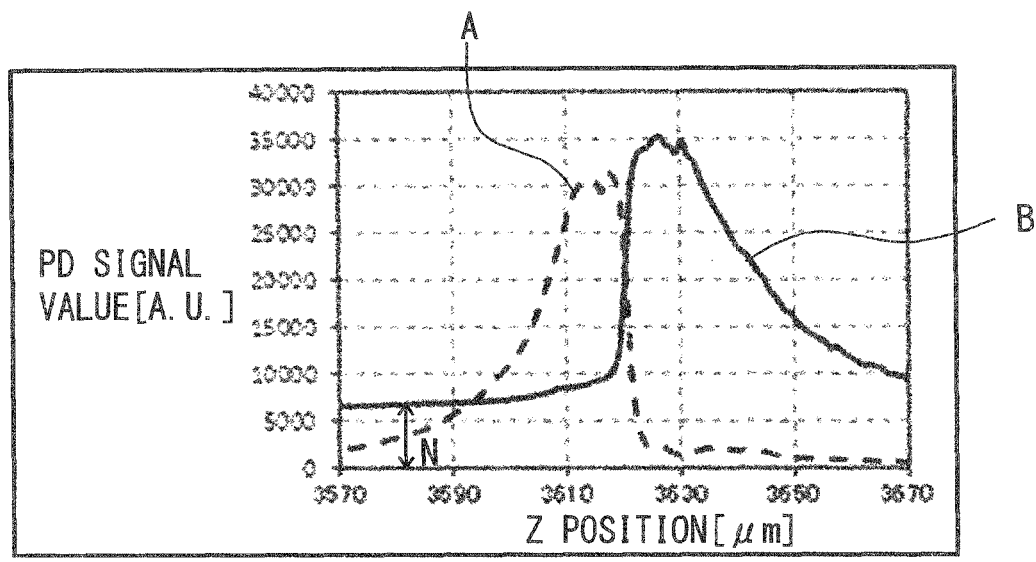
FIG. 2 explains an influence of flare light.

Also, when the AF device 100 detects a focusing state by using the determination method described above, there is a possibility that an incorrect determination will be made when the flare light has not been shielded sufficiently before being incident on the two-segment PD 117. This point will be explained later by referring to FIG. 2. FIG. 2 explains an influence of flare light, and shows signal values output from the two-segment PD 117 when the diaphragm 116 does not exist. The horizontal axis represents the Z positions indicating relative positional relationships between the state 11 and the objective 13. The vertical axis represents signal values output from the two-segment PD 117. Lines A and B represent outputs from the PD 117a and the PD 117b, respectively.

As shown in FIG. 2, when the diaphragm 116 does not exist, the signal value output from the PD 117a (line A) can becomes zero by changing into a certain Z position, whereas the signal value output from the PD 117b (line B) cannot become zero even if the Z position is changed anywhere. This is because not only AF light reflected by sample S but also the flare light is incident on the PD 117b. As a result of this, the signal value from the PD 117b is increased by the amount of flare light and a signal value containing noise N is output from the PD 117b. Regarding the PD 117a, because almost all of the flare light has been shielded by the light shielding plate 113, an influence of the noise is slight. As described above, because an influence of the flare light is concentrated on one of the PDs 117a and 117b when the diaphragm 116 does not exist, there is a possibility that the focusing state will be detected incorrectly. Because of this, the AF device 100 is provided with the diaphragm 116.

Figure 3:
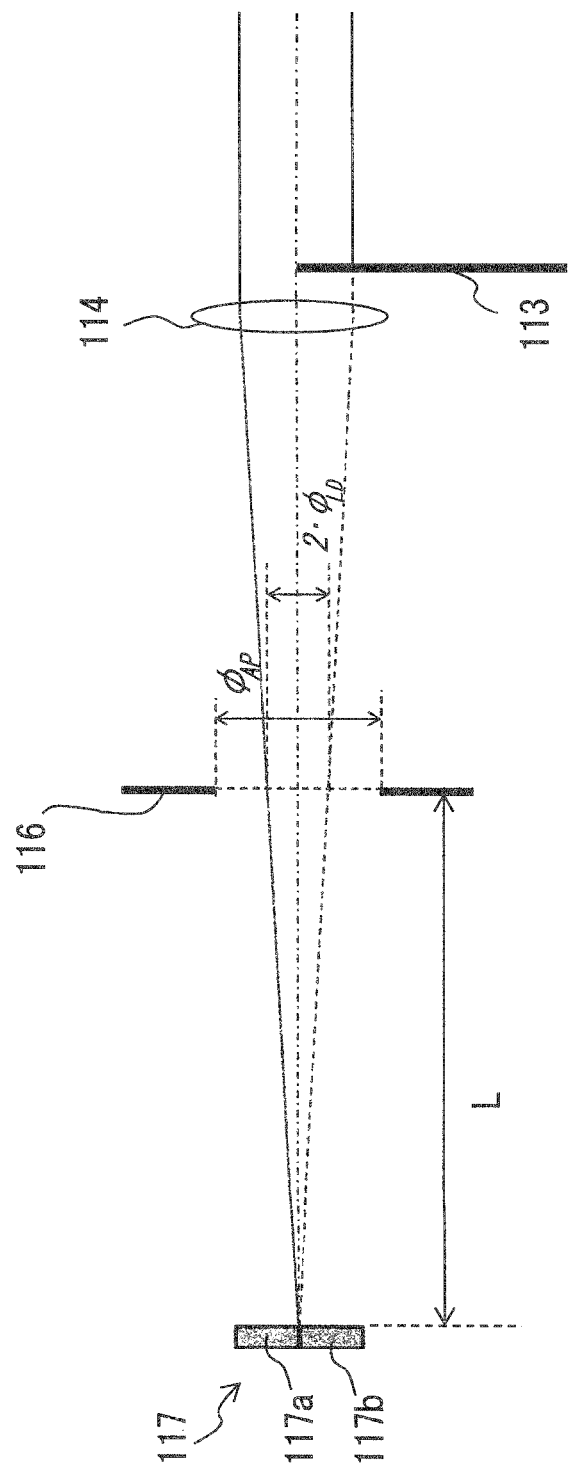
FIG. 3 explains a diaphragm arranged in front of a two-segment photodiode included in the microscope device shown in FIG. 1.

Hereinafter, the diaphragm 116 will be explained in detail by referring to FIG. 3. The diaphragm 116 is a light shielding member that is arranged between the tube lens 114 and the light receiving plane of the two-segment PD 117 (i.e., the focal plane of the tube lens 114) in order to suppress the amount of the flare light incident on the two-segment PD 117. An aperture, the center of which is located on the optical axis of the tube lens 114, is formed in the diaphragm 116.

The existence of the diaphragm 116 imposes a limitation on the incidence of the flare light on the two-segment PD 117. The exit NA of the autofocus optical system in an AF device is from approximately 0.01 through 0.064 as a general thing. This taken into consideration, it is desirable that the AF device 100 satisfy condition expression (1) in order to secure a sufficiently long acquisition range while suppressing flare light. Further, it is also desirable that the AF device 100 satisfy condition expression (2) in order to more effectively suppress flare light.

$$2.1 < \Phi AP/(2 \cdot \Phi LD) \quad (1)$$

$$2.1 < \Phi AP/(2 \cdot \Phi LD) < 6.7 \quad (2)$$

In the above expressions, $\Phi AP$ is the diaphragm diameter (aperture diameter) of the diaphragm 116 and $\Phi LD$ is the light flux diameter of the light reflected by sample S (more precisely, light reflected by the plane serving as the target of the autofocus, which will be referred to as normal light hereinafter) in the diaphragm 116 in a state in which the normal light is condensed by the autofocus optical system on the light receiving plane of the two-segment PD 117 (i.e., in the focusing state).

Condition expression (1) is an expression that defines the diaphragm diameter on the basis of the relationship with the light flux diameter. The reason for doubling light flux diameter $\Phi LD$ is in consideration of the fact that the normal light incident on the diaphragm 116 is light having the half of its light flux shielded by the light shielding plate 107 and the light shielding plate 113 and is in a semicircular shape. While it is possible to prevent the normal light from being shielded by the diaphragm 116 in the focusing state if $\Phi AP/(2 \cdot \Phi LD)$ is equal to or greater than one, there is a possibility that the normal light will be shielded together with the flare light in a non-focusing state. In order to secure an acquisition range of a substantial length, it is necessary to detect at least a prescribed amount of the normal light even in a non-focusing state. Accordingly, it is desirable that $\Phi AP/(2 \cdot \Phi LD)$ be great, specifically greater than 2.1, in order to suppress the shielding of the normal light in a non-focusing state.

FIG. 4 shows relationships between the diaphragm diameters and the acquisition ranges in the microscope device 10, which are results of calculation of an acquisition range for each diaphragm diameter by simulation. The simulation is based on the following conditions.

Numerical aperture on the exit side (the side of the two-segment PD 117) of the autofocus optical system Exit NA=0.023

Distance L from the light receiving plane of the two-segment PD 117 to the diaphragm 116

L=4.2 mm

Twice the light flux diameter of the normal light incident on the diaphragm 116 in the focusing state $2 \cdot \Phi LD$=0.19 mm As shown in FIG. 4, the greater the diaphragm diameter is, the less the normal light is shielded, leading to a longer acquisition range. When diaphragm diameter $\Phi AP$ is greater than about 0.4, i.e., when $\Phi AP/(2 \cdot \Phi LD)$ is greater than 2.1, an acquisition range of approximately 200 μm or longer is obtained. By setting the acquisition range to be equal to or longer than 200 μm, it is possible to make the AF device operate stably so as to detect the focusing state even when the surface of a sample is uneven or inclined. Accordingly, it is desirable that the AF device 100 satisfy condition expression (1) in order to secure an acquisition range of a sufficient length while suppressing flare light.

FIG. 5 shows relationships between the diaphragm diameters and the S/N ratios in the microscope device 10, which are the results of calculation of the S/N ratio for each diaphragm diameter by simulation. The conditions for the simulation are similar to those in the case of FIG. 4. Also, FIG. 6 shows relationships between the diaphragm diameters, the acquisition ranges, and the S/N ratios, and is a result of superposing the graphs shown in in FIG. 4 and FIG. 5. Note that an S/N ratio is the ratio of the amount of normal light to the amount of flare light.

As shown in FIG. 5 and FIG. 6, the greater the diaphragm diameter is, the less flare light is shielded, leading to a situation where noise components become larger and the S/N ratio decreases. When diaphragm diameter $\Phi AP$ has become equal to or greater than about 1.3, i.e., when $\Phi AP/(2 \cdot \Phi LD)$ has become equal to or greater than 6.7, the S/N ratio decreases to less than about 10. An AF process tolerant to flare light is realized by securing an S/N ratio that is equal to or higher than 10. In other words, it is possible to detect the focusing state even under a condition in which intense flare light is generated. Accordingly, in order to sufficiently suppress the flare light and to obtain an S/N ratio of ten or higher, it is desirable that the AF device 100 have an $\Phi AP/(2\Phi LD)$ smaller than 6.7. Also, in order to secure a long acquisition range while sufficiently suppressing the flare light, it is desirable that the AF device 100 satisfy condition expression (2) as shown in FIG. 6.

According to the AF device 100 of the present example configured as above and the microscope device 10 including the AF device 100, it is possible to detect a focusing state while securing a sufficiently long acquisition range even when an objective that generates flare light is used.

While FIG. 1 exemplifies the microscope device 10 as a device provided with the AF device 100, the AF device 100 can be used for all types of sample observation devices that are provided with objectives. However, because of the following reasons, applications to biological microscope devices are particularly effective.

The first reason is that the AF light reflectance of the plane serving as a target of focusing is low, and accordingly only a slight amount of flare light can hinder the detection of a focusing state. In this regard, according to the AF device 100, even when flare light has been generated in the objective or the autofocus optical system, the flare light can be sufficiently removed before being detected by the two-segment PD 117, making it possible to detect a focusing state.

The second reason is that a biological microscope is often used for observation in which the height level of the plane serving as a autofocus target easily changes, such as in multipoint time-lapse observation that utilizes a multi-well plate, and thus continuous AF function is used often. In this regard, according to the AF device 100, because a long acquisition range can be realized, it is possible to stably maintain a focusing state by using a continuous AF function.

Also, while the above explanations have been given on an assumption that the diaphragm 116 having a prescribed aperture diameter is fixed at a prescribed position between the tube lens 114 and the two-segment PD 117, the diaphragm 116 may also be configured to have a variable aperture diameter. Also, the diaphragm 116 may be provided in such a manner that the diaphragm 116 can move freely along the optical axis of the autofocus optical system between the tube lens 114 and the two-segment PD 117. It is also possible to adjust the aperture diameter or the position of the diaphragm 116 in accordance with the objective when the objective used by the microscope device 10 is changed. Further, it is also possible to employ a configuration in which a diaphragm 116a having an aperture with an aperture diameter different from that of the diaphragm 116 is provided and the diaphragm 116 is provided in such a manner that the diaphragm 116 can be freely exchanged with the diaphragm 116a.

<Example 2>

Figure 7:
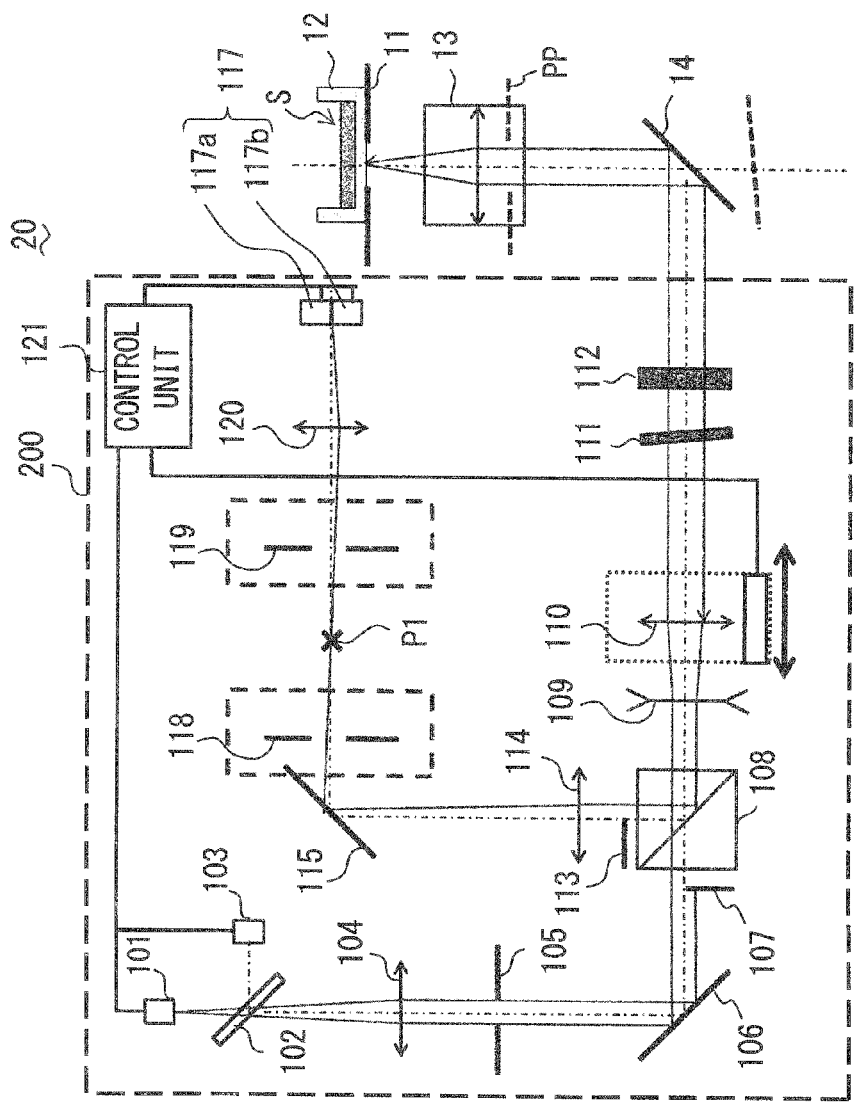
FIG. 7 exemplifies a configuration of a microscope device according to example 2 of the present invention.

FIG. 7 exemplifies a configuration of a microscope device 20 according to the present example. The microscope device 20 is different from the microscope device 10 in that the microscope device 20 is provided with an AF device 200 instead of the AF device 100. The microscope device 20 is similar to the microscope device 10 in the other aspects.

The AF device 200 is different from the AF device 100 in that the AF device 200 is provided with a relay optical system 120 between the tube lens 114 and the two-segment PD 117 and is provided with a diaphragms 118 and 119 instead of the diaphragm 116. The AF device 200 is similar to the AF device 100 in the other aspects.

The relay optical system 120 is configure to project the focal plane (intermediate imaging position PI) of the tube lens 114 onto the light receiving plane of the two-segment PD 117. In other words, while the two-segment PD 117 is arranged on the focal plane of the tube lens 114 in the microscope device 10, the microscope device 20 has the two-segment PD 117 arranged on a plane optically conjugate with the focal plane of the tube lens 114.

Similarly to the diaphragm 116 of the AF device 100, the diaphragms 118 and 119 are light shielding members for suppressing the amount of flare light that is incident on the two-segment PD 117. The diaphragms 118 and 119 are similar to the diaphragm 116 also in that the diaphragms 118 and 119 have apertures, the center of which is located on the optical axis of the tube lens 114. Further, the diaphragms 118 and 119 respectively have an aperture diameter that satisfies at least condition expression (1) and more desirably have an aperture diameter that satisfies condition expression (2). Note that the diaphragm 118 is arranged in the section, where the normal light is convergent light flux, between the tube lens 114 and the focal plane of the tube lens 114, whereas the diaphragm 119 is arranged in the section, where the normal light is divergent light flux, between the focal plane of the tube lens 114 and the relay optical system 120.

According to the AF device 200 and the microscope device 20 thus configured as well, it is possible to detect a focusing state while securing a sufficiently long acquisition range even when an objective that generates flare light is used, similarly to the AF device 100 and the microscope device 10 according to example 1.

Note that although FIG. 7 shows the diaphragms 118 and 119, the AF device 200 may include only one of the diaphragms 118 and 119. It is also possible to provide, between the relay optical system 120 and the light receiving plane of the two-segment PD 117, a diaphragm that satisfies at least condition expression (1) and more desirably both condition expressions (1) and (2) instead of the diaphragms 118 and 119.

The respective examples described above are for showing specific examples so as to facilitate the understanding of the invention, and the present invention is not limited to these examples. The AF device and the sample observation device can receive various modifications and changes without departing from the spirit of the present invention, the spirit being defined by the claims. A result of combining some features in the contexts of the individual examples explained in this specification may also be treated as an example.

What is claimed is:

1. An autofocus device for a sample observation device provided with an objective, the autofocus device comprising:
    a photodetector that detects light;
    an autofocus optical system that includes a tube lens, guides light to one of two regions on a pupil plane of the objective that has been divided into two along an optical axis of the objective, and guides light that has passed through the other of the two regions after being reflected by a sample to the photodetector via the tube lens; and
    a light shielding member which is arranged between the tube lens and a light receiving plane of the photodetector and on which an aperture has been formed, wherein
    $2.1 < \Phi AP/(2 \cdot \Phi LD)$ is satisfied where $\Phi AP$ represents an aperture diameter of the light shielding member and $\Phi LD$ represents a light flux diameter, on the light shielding member, of light reflected by the sample in a state in which the light is condensed on the light receiving plane by the autofocus optical system.

2. The autofocus device according to claim 1, wherein $2.1 < \Phi AP/(2 \cdot \Phi LD) < 6.7$ is satisfied.

3. The autofocus device according to claim 1, wherein the light shielding member is arranged between the tube lens and a focal plane of the tube lens.

4. The autofocus device according to claim 1, further comprising
    a relay optical system that is arranged between the tube lens and the photodetector and that projects a focal plane of the tube lens onto the light receiving plane, wherein
    the light shielding member is arranged between the relay optical system and the light receiving plane.

5. The autofocus device according to claim 1, further comprising
    a relay optical system that is arranged between the tube lens and the photodetector and that projects a focal plane of the tube lens onto the light receiving plane, wherein
    the light shielding member is arranged between the focal plane of the tube lens and the relay optical system.

6. The autofocus device according to claim 1, wherein the light shielding member is configured in such a manner that the aperture diameter of the light shielding member is variable.

7. The autofocus device according to claim 1, wherein the light shielding member is arranged in such a manner that the light shielding member can move along an optical axis of the autofocus optical system.

8. The autofocus device according to claim 1, wherein the light shielding member is arranged in such manner that the light shielding member can be freely exchanged with a light shielding member on which an aperture having an aperture diameter different from the aperture diameter of the light shielding member has been formed.

9. A sample observation device comprising:
    an objective; and
    the autofocus device according to claim 1.

* * * * *